United States Patent [19]

Yamauchi et al.

[11] Patent Number: 4,701,091

[45] Date of Patent: Oct. 20, 1987

[54] APPARATUS FOR PILING PORTLAND CEMENT PACKAGES IN ALIGNMENT ON PLATFORM

[75] Inventors: Kouji Yamauchi; Chikai Ueda, both of Tokyo, Japan

[73] Assignee: Mitsubishi Mining & Cement Co., Ltd., Tokyo, Japan

[21] Appl. No.: 871,872

[22] Filed: Jun. 6, 1986

[30] Foreign Application Priority Data

Jun. 13, 1985 [JP] Japan .................................. 60-89471

[51] Int. Cl.$^4$ .............................................. B65G 57/06
[52] U.S. Cl. ....................................... 414/70; 414/80; 414/398
[58] Field of Search ...................... 414/70, 80, 76, 82, 414/84, 68, 398

[56] References Cited

U.S. PATENT DOCUMENTS

| | | | |
|---|---|---|---|
| 3,416,674 | 12/1968 | Gualandris et al. | 414/70 X |
| 3,513,991 | 5/1970 | McWilliams | 414/68 |
| 3,779,404 | 12/1973 | McWilliams | 414/398 X |

FOREIGN PATENT DOCUMENTS

| | | | |
|---|---|---|---|
| 2633170 | 2/1977 | Fed. Rep. of Germany | 414/80 |
| 2750741 | 5/1979 | Fed. Rep. of Germany | 414/82 |
| 2307735 | 11/1976 | France | 414/82 |
| 7707862 | 1/1979 | Sweden | 414/84 |

Primary Examiner—Kenneth J. Dorner
Assistant Examiner—James R. Brittain
Attorney, Agent, or Firm—Bierman & Muserlian

[57] ABSTRACT

An efficient apparatus for automatically piling paper bag packages of Portland cement in alignment on a platform of a truck comprises a back and forth traveling supply conveyor and a loading device connected at the delivery end thereof. The loading device has two distributing carriages which respectively can receive each package supplied from the conveyor and carry it transversely to the predetermined position, and also has bottom gates through which each package passes to fall onto the exact aligned position on the platform.

7 Claims, 4 Drawing Figures

APPARATUS FOR PILING PORTLAND CEMENT PACKAGES IN ALIGNMENT ON PLATFORM

BACKGROUND OF THE INVENTION

The present invention relates to an apparatus for piling Portland cement packages in alignment, on the loading platform of a truck or the like.

In the distributive stage, two transportation ways of Portland cement are prevailing. One is for stationary consumer plants where bulk cement transportation containers such as tank lorries are employed, while the other for wholesalers, temporary construction sites or comparatively small lot users, scaled cement packages in paper bags are carried by trucks. Portland cement package is arranged, for example, in a sealed paper bag of around 40 kg by an automatic packer at a cement distribution service station. A number of cement packages arranged by the automatic packer are piled one upon another on the loading platform of a truck.

Packages must be aligned both horizontally and vertically on the loading platform, which was formerly done manually by two or three workers. In recent years, in order to save such heavy man power labor, an apparatus is desired which can automatically pile packages of Portland cement efficiently on the loading platforms of trucks, aligning them both horizontally and vertically. Such package piling apparatuses are disclosed in Japanese Laid-Open Utility model Patent Disclosure Sho 60-6724 (No. 6724/1985) and Sho 59-116327 (No. 116327/1984), and have been put to practical use.

The former apparatus comprises a swinging belt conveyor with a swinging chute at the head thereof. The belt conveyor is pivoted at the tail end. The motion of the belt conveyor and the chute is to be controlled so as to exactly put each package in predetermined position, it presumably is difficult for the apparatus to move itself quickly corresponding to continual series of packages supplied from an automatic packer, which results in lack of high efficiency. It may be assumed that the apparatus can pile packages of cement totally weighing about 24 tons per hour at the most, which may not meet the usual packing rate of the automatic packer of 36 to 45 tons per hour. Obviously, the piling efficiency of the apparatus falls short of the ability of the automatic packer.

The latter apparatus disclosed has a distribution shelf which can support two packages of Portland cement simultaneously. The shelf can move back and forth, up and down, and left to right and vice versa. In this apparatus, two cement packages at a time are supplied onto the shelf by an intermittently moving feeder belt conveyor. The shelf, now supporting two bags, must be moved from the receiving position to any desired piling position on or above the loading platform of a truck or the like. The apparatus, therefore, needs to have a guide mechanism for guiding the shelf to such a position. Inevitably, the larger the loading platform, the longer is the distance the shelf has to move. The piling efficiency of this apparatus seems to be limited by the complicated motion of the shelf, which means this apparatus also falls short of the ability of the automatic packer.

SUMMARY OF THE INVENTION

An object of the present invention is to provide an apparatus for automatically piling packages of Portland cement, which has a high efficiency fully corresponding to the ability of the automatic packer in common use.

Another object of the invention is to provide a package piling apparatus having a simple structure and costing relatively inexpensive.

According to the invention, there is provided a Portland cement package piling apparatus comprising:
at least one first guide rail fixed in position;
a conveyor extending in the lengthwise direction of the first guide rail and movably mounted on the first guide rail, for transporting packages;
supplying means to supply packages, one by one, on to the conveyor;
a second guide rail provided at one end of the first guide rail, extending parallel to each other along the first rail and spaced apart from each other for a prescribed distance, said second guide rail being arranged such that the loading platform of a truck or the like can be positioned below the second guide rail; and
a loading device being suspended from the second guide rail and being able to move while guided by the second guide rail, said loading device having a distributing head coupled to the head end of the conveyor, and an elevator means for lifting and lowering the distributing head, said distributing head including:
a pair of carriages able to receive on package of cement each, from the conveyor, and movable along two independent distributing routes extending perpendicular to the second guide rail;
drive means for moving the carriages along the distributing routes and stopping the carriages at predetermined positions in the distributing routes; and
releasing means for releasing packages from the carriages, allowing the packages to fall.

In the package piling apparatus of this invention, the carriages of the distributing head receive one package of cement each, move along the respective distributing routes until they reach the desired positions. At the desired position, the releasing means releases the packages from the carriages, whereby the packages fall onto the loading platform of the truck parked below the distributing head. Hence, packages of cement can be arranged and piled on the platform as the carriages and the release means are repeatedly operated; they can thus be aligned in the horizontal direction, forming one row. Then, if necessary, the distributing head is lifted, and the carriages and release means are repeatedly operated, thus forming another row of packages on the first row. The distributing head is further lifted, and the carriages and release means are operated repeatedly, until a desired number of rows of packages, arranged one upon another, are formed on the platform. Thereafter, the loading device is moved in the horizontal direction along the second guide rails for a distance equal to the width of the package of cement. This done, the distributing head is repeatedly operated in the manner described above, whereby packages of cement are arranged and piled on the platform both in the horizontal direction and in the vertical direction.

The distance one carriage must move to form one row of packages is, of course, equal to the length of the row. Since the distributing head has two carriages, each carriage needs to move only half said distance. The carriages can, therefore, pile packages of cement on the loading platform at a high speed, aligning the packages both horizontally and vertically. Hence, the package piling apparatus according to the invention can be used in combination with the automatic packer, without wasting the ability of the automatic packer.

Since each carriage moves only the same distributing route, the mechanism for guiding the carriage can be simple in structure. This can not only simplify the structure of the package piling apparatus, but also reduce the manufacture cost of the apparatus.

Furthermore, the conveyor, which is guided by the first guide rail while moving, is coupled to the distributing head. For this reason, the conveyor and the head can maintain a specific positional relation even when the head moves along the second guide rail or when the head is lifted or lowered. As a result, packages of cement can be easily and reliably transferred from the conveyor to the distributing head.

DETAILED DESCRIPTION OF THE PREFERRED EMBODIMENTS

Figure 1:
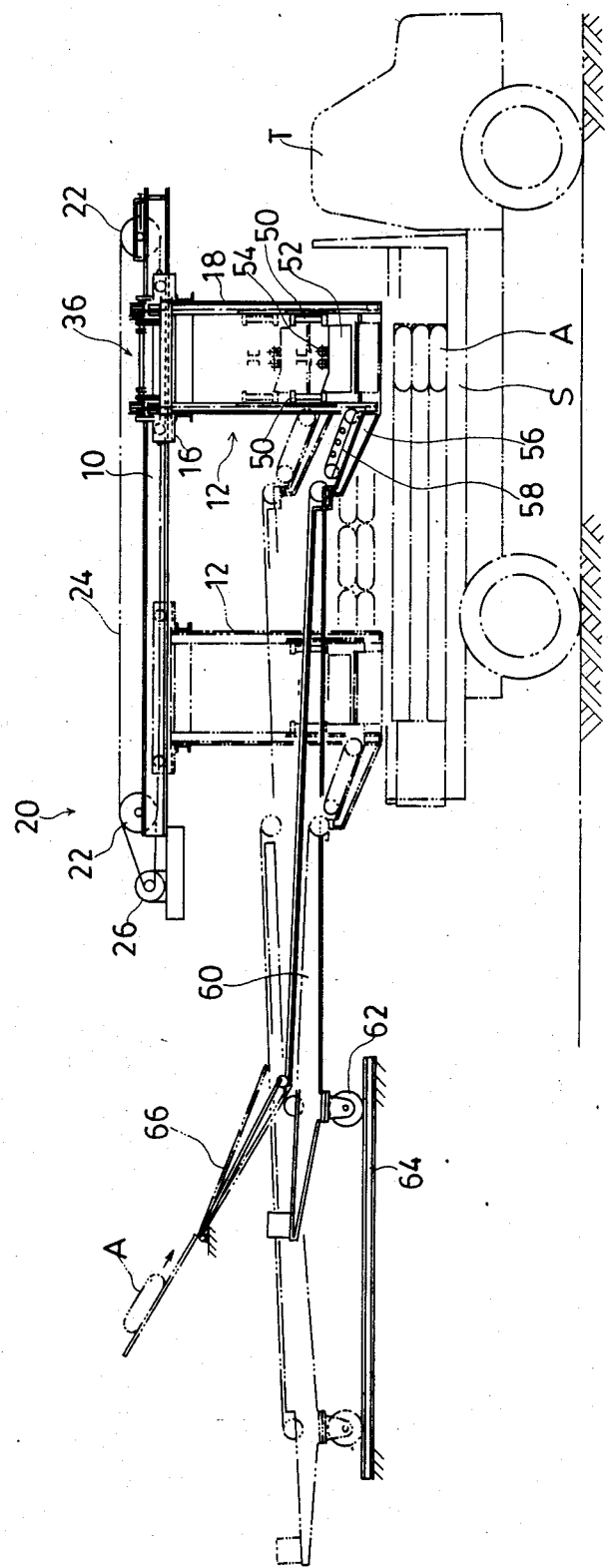
FIG. 1 is a side view of a package piling apparatus according to an embodiment of the present invention.

As shown in FIG. 1, a package piling apparatus according to this invention comprises a pair of guide rails 10 extending parallel and spaced apart in the horizontal direction by a predetermined distance. Below these guide rails, the loading platform S of a truck T can be positioned.

Movable frame 12 comprises a rectangular, horizontal frame 16 mounted on guide rails 10, with a plurality of wheels 14 interposed between frame 12 and rails 10, and box-shaped, vertical frame 18 suspended from horizontal frame 16. Horizontal frame 16 can move along guide rails 10. Vertical frame 18 can horizontally move in the direction at right angles to guide rails 10. The width of vertical frame 18 is greater than that of loading platform S by a predetermined value.

Drive mechanism 20 is mounted on guide rails 10 to move frame 12 along guide rails 10. As illustrated in FIG. 1, drive mechanism 20 comprises a pair of sprocket wheels 22, provided at the ends of rails 10, respectively, a loop of chain 24 wrapped around sprocket wheels 22, and motor 26 for driving chain 24, which is connected to vertical frame 16, thereby to move frame 12 back and forth along guide rails 10, and hence in the lengthwise direction of loading platform S of truck T. Therefore, movable frame 12 can be brought to any point in the lengthwise direction of platform S.

Figure 2:
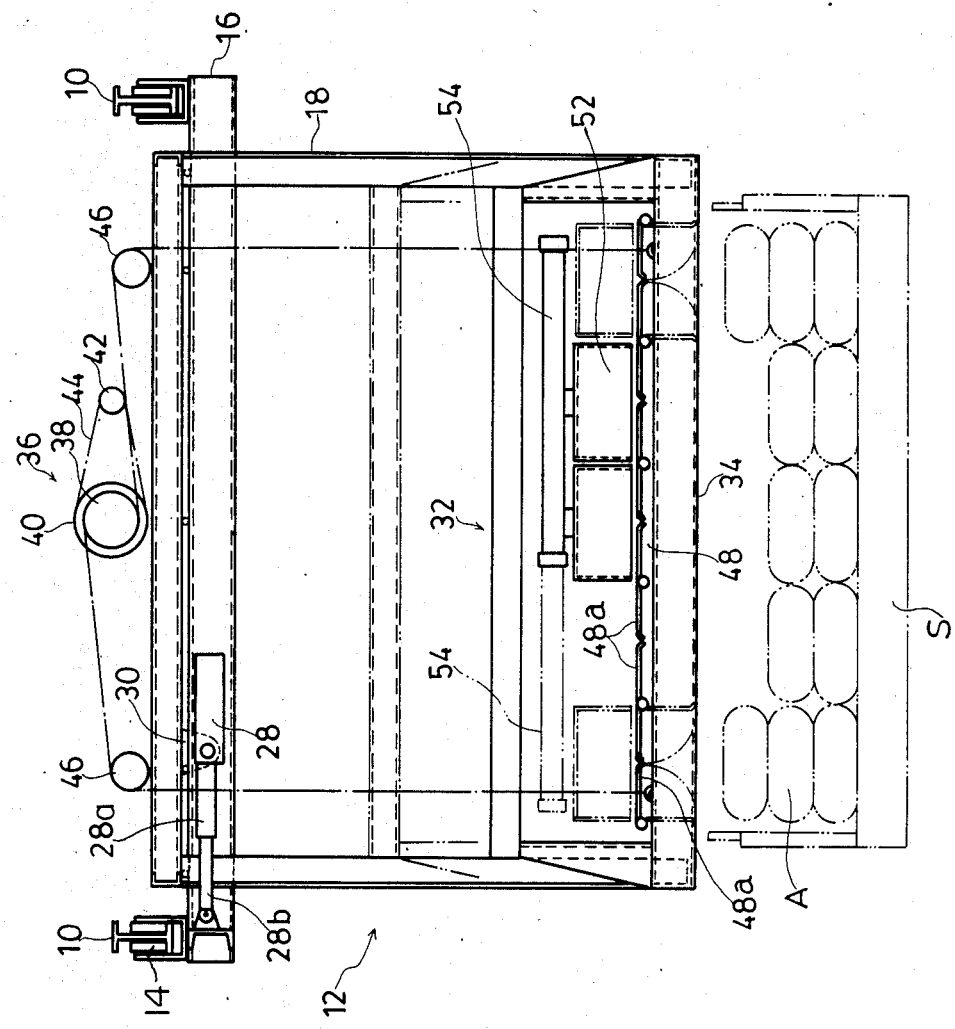
FIG. 2 is a front view of the distributing head used in the apparatus shown in FIG. 1.
Figure 3:
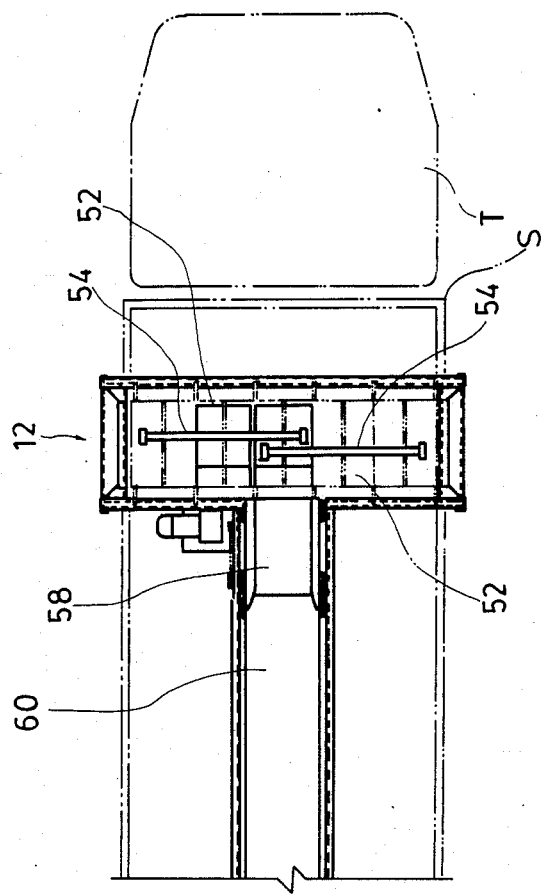
FIG. 3 is a plan view of part of the package piling apparatus shown in FIG. 1.

As shown in FIG. 2, hydraulic cylinder 28 is attached to movable frame 12. Cylinder 28 is used to move vertical frame 18 slightly with respect to horizontal frame 16 in the vertical direction at right angles to guide rails 12, that is, in the widthwise direction of platform S of truck T. Hydraulic cylinder 28 comprises cylinder body 28a and piston rod 28b. Cylinder body 28a is connected to vertical frame 18 by bracket 30 and piston rod 28b is coupled at the distal end to horizontal frame 16. Therefore, when hydraulic cylinder 28 is operated, vertical frame 18 of movable frame 12 can be accurately set in any desired position above loading platform S of truck T.

Distributing head 32 for distributing packages A of cement is provided in the lower end portion of vertical frame 18. Head 32 has elevator platform 34. Platform 34 is arranged within vertical frame 18 and forms the bottom of frame 18. Elevator platform 34 can move up and down, guided by the four vertical pillars forming frame 18. The vertical movement of platform 34 is controlled by a pair of elevator mechanisms 36 mounted atop vertical frame 18.

Each elevator mechanism 36 comprises wire drum 38, sprocket wheel 40 concentrically connected to drum 38, sprocket wheel 42 which can be rotated by a motor (not shown) in forward and reverse directions, loop of chain 44 wrapped around sprocket wheels 40 and 42, and two wires 44 wound about drum 38 in the same direction. Wires 44 are fastened at one end to wire drum 36. As shown in FIG. 2, the free end portions of wires 44 are guided by two sheaves 46, respectively, and vertically extend downwards, and are connected to distributing head 32.

Elevator platform 34 of head 32 has five gates 48 arranged side by side along in the widthwise direction of truck T. Each gate 48 has two door plates 48a. Door plates 48a are hinged and can be opened downwardly by hydraulic cylinder 50 (FIG. 1). When door plates 48a were swung open, one package A of cement falls from the gate under the gravity. The door plates of each gate are opened simultaneously to make an opening wide enough to allow one package A to pass. Gates 48 can open either at the same time or at different times. Any gate provide a slide surface for packages A as long as plates 48a are closed.

Two movable frames 52 are provided on elevator platform 34, i.e., gates 48. Each of the movable frames is rectangular box, large enough to contain only one package A of cement. It has two rectangular openings, one cut in the bottom and the other cut in the wall which is rear with respect to truck T. Movable frames 52 are connected to two rod less hydraulic cylinders 54 secured to distributing head 32 and extending parallel to elevator platform 34. When hydraulic cylinder 54 connected to the first movable frame 52 is operated, first movable frame 52 can move between the center gate and the gate leftmost with respect to truck T. Hence, first movable frame 52 can be aligned with any gate 48 positioned on the left half of distributing head 32. Similarly, when the other hydraulic cylinder 54 coupled to the second movable frame 52 is operated, second movable frame 52 can move between the center gate and the gate rightmost with respect to truck T. Second movable frame 52 can, therefore, be aligned with any gate 48 arranged on the right half of distributing head 32.

As illustrated in FIG. 1, support 56 is attached to the lower end of distributing head 32. This support extends toward the rear of truck T. Feeder 58 is mounted on support 56 for conveying packages A of cement to distributing head 32. Support 56 is so positioned that one end of feeder 58 is continous with the center gate 48. As may be clearly seen from FIG. 1, feeder 58 comprises a plurality of rollers and extends toward the rear of truck T. The other end of feeder 58 is positioned at a level above the first end continuous with center gate 48. In other words, feeder 58 is inclined down toward center gate 48. This facilitates the supply of packages A to center gate 48; on the inclined feeder, packages A slide down to center gate 48. Feeder 58 is designed to supply packages A to center gate 48 intermittently, one by one.

Conveyor 60 is connected at one end of the other end of feeder 58 by a joint (not shown). This joint is constructed such that conveyor 60 is kept coupled to feeder 58 even when vertical frame 18 slightly moves in the widthwise direction of loading platform S of truck T. Conveyor 60 is long enough to extend rearward beyond guide rails 10. Wheel 62 is attached to the other end of conveyor 60. This wheel is put in rolling contact with guide rail 64. Rail 64 extends parallel to guide rails 10 and fixed in position. Hence, conveyor 60 moves while guided by rail 64 as movable frame 12 moves while guided by guide rails 10.

Chute 66 is provided above conveyor 60. The lower end of chute 66 is located close to the upper surface of conveyor 60 irrespective of the horizontal movement of conveyor 60. The other end (or upper end) of chute 66 is coupled to an automatic packer (not shown). Packages A of cement supplied to chute 66 from the automatic packer will be, therefore, transferred from chute 66 to conveyor 60, regardless of the position of conveyor 60.

The operation of the package piling apparatus will now be explained.

Packages A of cement, sequentially supplied from the automatic packer to conveyor 60 through chute 66, are transported by conveyor 60 to feeder 56 coupled to distributing head 32. This supply of packages A is carried out after movable frame 12 has been moved to the position right above the front end of loading platform S of truck T. First movable frame 52 of distributing head 32 has already been moved to the position above center gate 48 in closed state. Therefore, first package A is supplied into first movable frame 52 by feeder 56. Thereafter, hydraulic cylinder connected to first movable frame 52 is operated, thus pushing first movable frame 52 to the left (FIG. 2) until frame 52 reaches the position right above the desired gate. As first movable frame 52 moves to this position, package A is pulled and, therefore, slides on gates 48 in the same direction as the moving direction of first frame 52. After package A is placed on gate 48 above which first movable frame 52 is positioned, two door plates 48a of this gate are opened by hydraulic cylinder 50. As a result, package A of cement falls onto the prescribed position on loading platform S of truck T.

When first movable frame 52 moves to the right (FIG. 2) from center gate 48, together with the first package, the other movable frame, i.e., second movable frame 52, pushed to the center gate by hydraulic cylinder 54 coupled to second frame 52. Second package A is, therefore, fed into second movable frame 52 by feeder 58. Then, second movable frame 52 is pushed to the right (FIG. 2) by hydraulic cylinder 54 and thereby positioned right above a desired gate 48. Second package A is simultaneously moved to this gate. This gate is opened, whereby second package A falls onto a prescribed position on loading platform S of truck T.

To lay a package of cement in the position right below center gate 48, it suffices to open center gate 48. Neither movable frame 52 needs to be moved.

Packages A of cement are supplied from conveyor 60 alternatively into two movable frames 52. As packages are supplied to distributing head 32, as movable frames 52 are repeatedly moved, and as gates 48 are opened and closed, packages A are arranged in a row extending the widthwise direction of loading platform S. If necessary, movable frame 12 is lifted, and two movable frames 52 are repeatedly moved, and gates 48 are opened and closed. The result is that packages A are laid on the packages forming said row, thereby forming another row. When movable frame 12 is lifted, that end of conveyor 60 which is coupled to feeder 58 is also moved upwardly. As a result, conveyor 60 rotates about the axis of wheel 62. Hence, conveyor 60 does not hinder the upward or downward movement of frame 12.

The piling apparatus of the invention can pile rows of packages A, one upon another, by repeating the above-mentioned sequence of operations. In other words, the apparatus can lay packages A of cement of loading platform S of truck T, aligning the packages in the vertical direction.

When one row of packages A, or rows of packages A, one laid upon another, are formed on loading platform S, movable frame 12 is moved toward the rear of truck T for the distance equal to the width of packages A. Thereafter, packages A of cement are supplied from conveyor 60 to distributing head 32, one after another. Movable frames 52 of head 32 are repeatedly moved, and gates 48 are opened and closed. In consequence, packages A of cement are piled on platform S. aligned one with another in both the horizontal direction and the vertical direction. The package-piling is achieved by sequencial control.

As may be clearly understood from the above, each package A of cement is pressed as it is pulled by movable frame 52. The package is inevitably deformed. Nonetheless. packages A of cement restore their original shape, provided they have just been packed by the automatic packer. Hence, on loading platform S of truck T, packages A of cement can be piled not only in horizontal alignment but also in vertical alignment. In addition, the speed of package piling can be enhanced merely by raising the speed at which movable frames 52 bring packages A to desired gates 48. That new packages of cement packed by the automatic packer have some elasticity and, if deformed, can quickly restore their shape has been proved by experiments. New packages of cement have elasticity, probably because air still exists between the cement particles.

Figure 4:
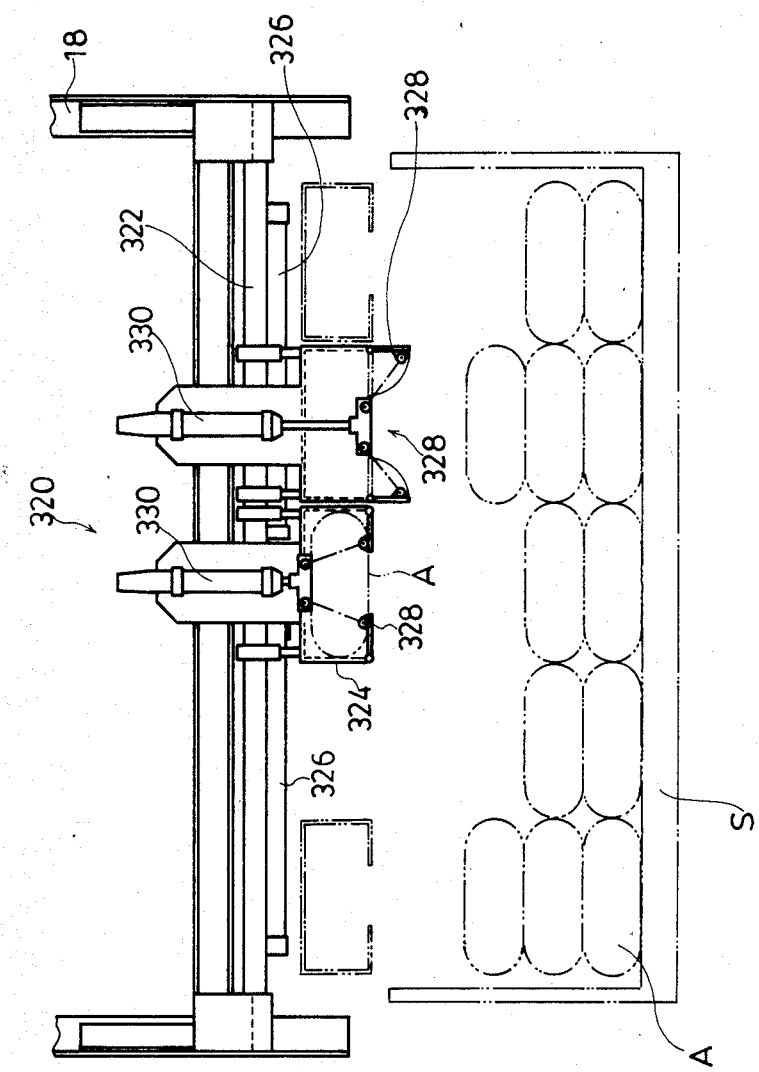
FIG. 4 is a front view of another distributing head according to the invention.

The present invention is not limited to the embodiment described above. Distributing head 32 can be replaced by the other type of a head illustrated in FIG. 4. In the head of FIG. 4, guide rods 322 are used in place of elevator platforms 34. Two movable boxes 324, which are equivalent to movable frames 52, are slidably connected to guide rods 322 by support arms. These movable boxes can be moved by hydraulic cylinder 326 in the widthwise direction of loading platform S of truck T.

Movable boxes 324 are generally similar to movable frames 52 in structure, but gate 328 having the same function as gate 48 is attached to each box 324, and one actuator 330 for opening and closing gate 328 is also secured to each box 324. As shown in FIG. 4, each actuator 330 comprises a hydraulic cylinder and two lengths of wire.

Distributing head 320 can pile packages A of cement in the same way as distributing head 32. This may be clearly under stood without explanation. Package A supplied into either movable box 324 is not pressed when it is moved to a desired position. Hence, when head 320 is employed, packages A can be protected from deformation or damage.

What is claimed is:

1. An apparatus for piling packages of cement in alignment on a loading platform, comprising:

at least one first guide rail fixed position;

a conveyor extending in the lengthwise direction of said first guide rail and movably mounted on said first guide rail, for transporting packages of cement;

supplying means for supplying packages of cement, one by one, to said conveyor;

a pair of second guide rails provided at one end of said first guide rail, extending parallel to each other along said first guide rail and spaced apart from each other for a prescribed distance, said second guide rails being arranged such that the loading platform of a truck or the like can be positioned below the second guide rails; and a loading device suspended from said second guide rails and being able to move while guided by said second guide rails, said loading device having a distributing head coupled to one end of said conveyor, and an elevating means for lifting and lowering the distributing head, said distributing head comprising;

a pair of carriages able to receive one package of cement each, from the conveyor, and movable along two independent distributing routes extending perpendicular to said second guide rails;

driving means for moving said carriages along the distributing routes and stopping said carriages at predetermined positions in the distributing routes; and release means for releasing packages of cement from the carriages, allowing the bags to fall.

2. The apparatus according to claim 1, wherein said distributing head further comprises a feeder for supplying one package of cement from said conveyor to each of said carriages.

3. The apparatus according to claim 1, wherein each of said carriages is shaped like a box and has one opening cut in the bottom and another opening cut in the side wall facing said conveyor, said distributing head further comprises a plate on which the package of cement supplied into each carriage can slide as the carriage moves, and said releasing means includes a plurality of gates attached to said plate and arranged side by side along said distributing routes, said gates allowing packages of cement to pass when opened.

4. The apparatus according to claim 3, wherein said driving means includes hydraulic cylinders connected to said carriages.

5. The apparatus according to claim 1, wherein each of said carriages is shaped like a box and has one opening cut in the bottom and another opening cut in the side wall facing said conveyor, and said releasing means includes a plurality of gates positioned below said carriages for receiving packages of cement from said carriages and allowing the packages to fall when opened.

6. The apparatus according to claim 1, wherein a wheel is attached to the other end of said conveyor, said wheel being in rolling contact with said first guide rail.

7. The apparatus according to claim 1, wherein said loading device further comprises adjusting means for slightly moving said distributing head along said distributing routes.

* * * * *